United States Patent [19]

Ohnmacht et al.

[11] 4,341,946
[45] Jul. 27, 1982

[54] ELECTRICAL RESISTANCE HEATING ELEMENT

[75] Inventors: Helmut Ohnmacht; Klaus Meywald, both of Kandel, Fed. Rep. of Germany

[73] Assignee: Fritz Eichenauer GmbH & Co. KG, Kandel, Fed. Rep. of Germany

[21] Appl. No.: 203,483

[22] Filed: Nov. 3, 1980

[30] Foreign Application Priority Data

Nov. 2, 1979 [DE] Fed. Rep. of Germany ....... 2944132

[51] Int. Cl.³ .......................... H05B 3/06; F24H 3/00
[52] U.S. Cl. .................................... 219/375; 219/370; 219/532; 219/537; 338/280; 338/293; 338/316
[58] Field of Search ............... 219/369, 370, 375, 270, 219/382, 523, 532, 536, 537, 552; 338/218, 280, 281, 282, 283, 284, 286, 290, 293, 316; 361/266

[56] References Cited

U.S. PATENT DOCUMENTS

| | | | |
|---|---|---|---|
| 1,139,076 | 5/1915 | Rutenber | 338/282 |
| 1,162,788 | 12/1915 | Lindquist | 338/216 X |
| 1,433,697 | 10/1922 | Candee | 338/218 |
| 2,769,885 | 11/1956 | Charconneau | 338/316 X |
| 2,841,683 | 7/1958 | Ogle et al. | 219/270 |
| 2,849,582 | 8/1958 | Van Der Perk | 338/290 X |
| 2,920,243 | 1/1960 | Taren | 219/270 |
| 3,002,075 | 9/1961 | Visos | 219/532 |
| 3,237,142 | 2/1966 | Nuss | 338/280 |
| 3,283,128 | 11/1966 | Snyder | 219/532 |
| 3,458,766 | 7/1969 | Little | 338/283 |

FOREIGN PATENT DOCUMENTS

| | | | |
|---|---|---|---|
| 428252 | 12/1947 | Italy | 338/282 |
| 558391 | 1/1944 | United Kingdom | 338/280 |
| 562904 | 7/1944 | United Kingdom | 338/280 |

*Primary Examiner*—Volodymyr Y. Mayewsky
*Attorney, Agent, or Firm*—Craig and Antonelli

[57] ABSTRACT

In an electrical resistance heating element (1) comprising a heating conductor support (3) of insulating material and a heating conductor (4) of resistance wire wound in meander or sinuously coiled manner with loop ends or bights (6) and loop legs or runs (8), the loops of the heating conductor (4) being arranged substantially in a single plane, and the inner loop ends (6) which are directed towards the heating conductor support (3) being situated in the edge region of the heating conductor support (3), it is proposed according to the invention to construct the heating conductor support (3) as a flat plate, the flat plate to be situated substantially in the same plane as the loops of the heating conductor (4). It is also proposed that the outer loop ends or bights (5) remote from the heating conductor support (3) are to be self-supporting and not secured. Because of this arrangement a resistance heating element can be manufactured at relatively small expense from a small number of different components, with very considerable mechanisation. Such a resistance heating element is used more particularly for the heating of gaseous media in hot air appliances, such as hair dryers or the like.

8 Claims, 3 Drawing Figures

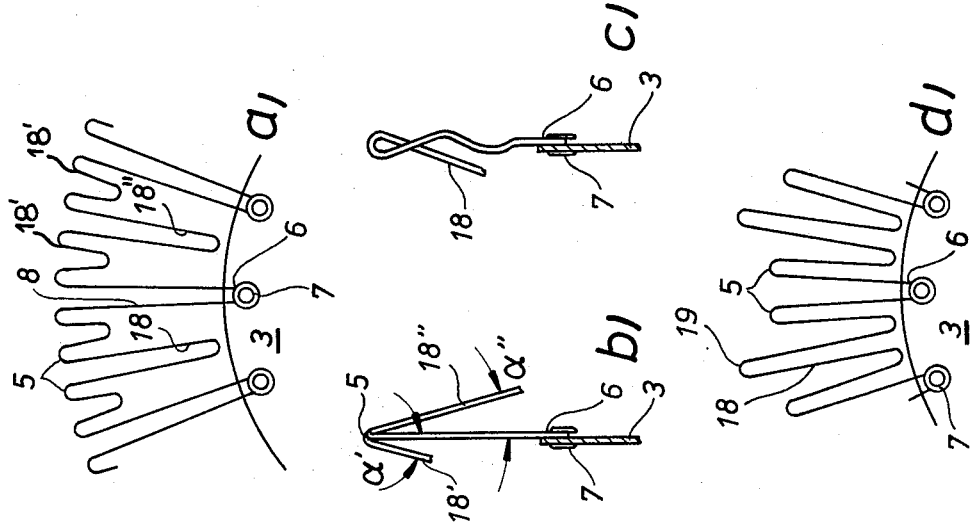
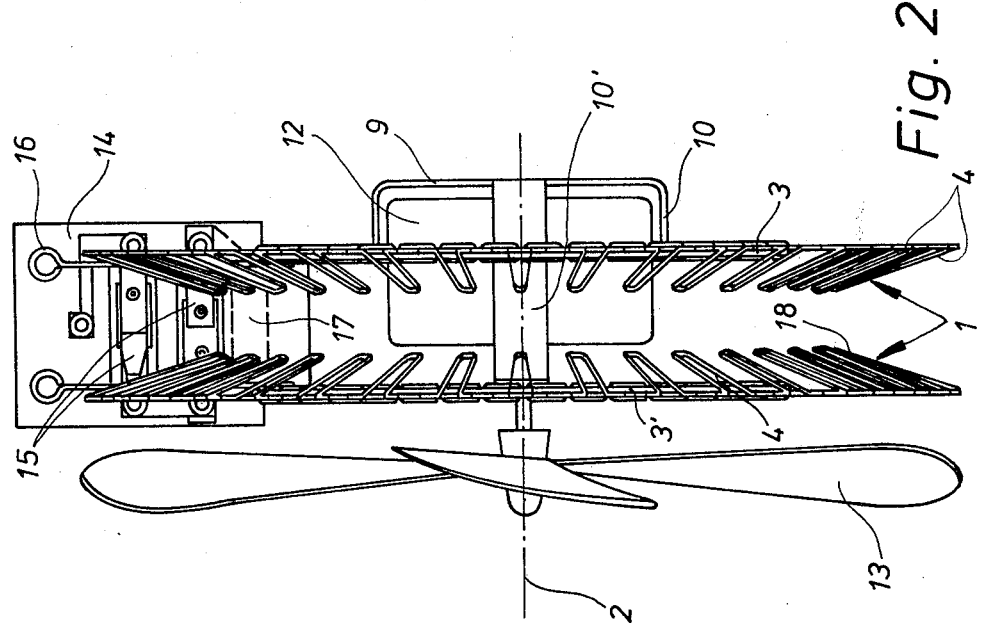

ELECTRICAL RESISTANCE HEATING ELEMENT

The invention relates to an electrical resistance heating element, more particularly for the heating of gaseous media, comprising a heating conductor support of insulating material and a heating conductor of resistance wire which is coiled in a meander or sinuous form to form loops having loop ends (or bights) and loop legs (or runs), the turns or loops being arranged substantially in a plane, and at least some of the inner loop ends (i.e. those which are directed towards the heating conductor support) being secured to the heating conductor support at an edge region thereof.

Within the framework of U.S. Pat. No. 3,237,142 and the present invention, what is understood by a sinuous coil is one wherein the heating conductor, which may have a round or, equally well, a rectangular cross-section, is wound in zigzag fashion substantially in a single plane, and is secured to the heating conductor support at the loop ends (or bights) which are thus formed. Securing can be effected in various ways, for example by means of rivets, eyelets, by bending-over the loop ends appropriately, and so forth. In every case an arrangement is obtained wherein the loop legs (or runs) radiate substantially at right-angles to the contour of the heating conductor support, and extend about the heating conductor support in a peripheral region of substantially uniform width. The plan of the heating conductor support, and the periphery part over which the coil extends, may per se be substantially optional. When used for axial or circular fans or blowers, to which the invention more particularly refers, the heating conductor support has a substantially circular plan, and the coil extends substantially over the entire periphery. The coil plane, of course, is situated substantially at right-angles to the incident flow direction of the air or other gas which is to be heated.

In a known resistance heating element of the type described hereinbefore (cf. German Patent Specification No. 11 85 743) the (inner) heating conductor support comprises a cylinder section, an outer heating conductor support is also provided in the form of a cylinder section, which is coaxial with the inner one, and the coil tips or bights are secured at the inner and outer sides to the heating conductor supports. The coil plane is situated substantially at right angles to the common cylinder axis of the two heating conductor supports. For securing purposes, the coil tips are inserted in recesses situated appropriately opposite in the heating conductor supports. This known resistance heating element has been found to work excellently in actual practice. But it is a disadvantage that, particularly in the case of the constructional form with circular plan which has been discussed, production involved relatively considerable expense and allows mechanisation only to a small extent.

Resistance heating elements of another type are also known (cf. German Laid-open Specification No. 24 07 588) wherein the heating conductor support comprises a plurality of plates of insulating material arranged in star-shaped formation and held in U-shaped holding straps by supporting rings, and a conventional spiral coil is tensioned over the insulating plates. The production of the resistance heating elements of this other type is also relatively involved, and there is a risk that, if a coil fracture occurs, voltage-conducting coil sections may come into contact with the housing or even project out of housing perforations, unless supporting filaments are threaded into the spiral coil, involving further additional expense.

An object of the present invention is to provide a resistance heating element of the type described initially herein which can be manufactured less expensively from a small number of different components parts and with the possibility of substantial mechanisation.

According to the present invention there is provided an electrical resistance heating element comprising a heating conductor support of insulating material and a heating conductor of resistance wire which is sinuously coiled to form loops having inner and outer loop ends and loop legs, the loops being arranged substantially in a plane, at least some of the inner loop ends being secured to the heating conductor support at an edge region thereof, the heating conductor support being constructed as a flat plate substantially co-planar with the loops of the heating conductor, and the outer loop ends remote from the heating conductor support being arranged in self-supporting manner without fixing means. Thus the invention proposes that the outer loop ends project freely from the heating conductor support, and only the inner loop ends are secured on the heating conductor support, usually at the face thereof perpendicular to the axis. Securing is preferably carried out with the use of eyelets, rivets or the like. This is simple to effect as regards manufacturing technique, and can be mechanised to a considerable extent, and requires a minimum of different components even if there are different layouts as regards dimensions, electrical power, etc. Although in a resistance heating element according to the invention the outer loop ends are not supported, it has been found in actual practice surprisingly that the loops maintain a satisfactorily stable position even under the mechanical influence of the throughflowing air or other gas which has to be heated.

As a rule the heating conductor support will be situated inside the heating conductor coil as described hereinbefore, and, as explained, in that case the inner loop ends are secured to the heating conductor support. But in principle it is also possible to have the reverse arrangement, wherein the outer loop ends are secured to a heating conductor support surrounding the loops.

It is true that in appliances of another type, namely in toasters, it is known (cf. U.S. Pat. No. 3,283,128) to connect flat sinuous heating conductor loops only unilaterally by eyelets to a holding strip of insulating material. Even in that case the loop ends remote from the holding strip are secured by means of an insulating strip for stability purposes. No suggestion has led therefrom for further development of resistance heating elements for hot air appliances, above all because in hot air appliances considerable mechanical stressing of the loops occurs because of the incidence of the air to be heated. For that reason, hitherto in resistance heating elements of the constructional type described initially herein, for hot air appliances, the loop ends have without exception been secured at both sides.

In the case of the hot air appliances for which the resistance heating elements according to the present invention are intended, it is usually desired to achieve a high level of heating power, distributed more or less uniformly over the flow cross-section in which the heating conductor is arranged. This can lead to problems as regards the edge region of the heating conductor support on which the loop ends of the heating conductor are secured and where, consequently, there is a relatively high concentration of the converted electrical power, with corresponding thermal stressing of the support material. This applies more particularly when the heating conductor loops are arranged not linearly adjacent one another but running around the contour of the heating conductor support as for example in the case of a circular fan. The diverging arrangement of the individual loops has the result that in the outer region the spacings of neighbouring loops are relatively large and consequently there is only a relatively low power density. This can be remedied by increasing the loop density, but this leads to a corresponding increase in the power density in the inner region, and thus to unallowable thermal stresses on the heating conductor and heating conductor support. Thus uniform power delivery over the flow cross-section also cannot be achieved.

These problems, which occur more particularly with heating elements for circular fans or the like, can be remedied by a particularly advantageous arrangement of the resistance heating element according to the present invention, which is characterised in that between the loops secured at the inner loop ends to the heating conductor support there are interposed free loops which are directed towards the heating conductor support and are of relatively short length in relation to the secured loops. By "free" loops there are meant loops which are arranged similarly to the usual "secured" loops, but are not secured to the heating conductor support and instead, because of their relatively short leg length, terminate with their ends at a more or less considerable spacing from the edge of the heating conductor support, whereas the outer ends of all the loops are situated at a substantially uniform spacing from the edge of the heating conductor support. Depending on needs in individual cases, one free loop or a plurality of free loops may be interposed between each two secured loops. Optimum heating power without thermal overstressing of the heating conductor support can be obtained by arranging the free loops to extend substantially to the edge of the heating conductor support, but without contacting it. The distribution of the heating power over the throughflow cross-section can be deliberately influenced by suitable choice of the leg length of the free loops. An even further improvement of the heating power distribution over the cross-section of flow can be achieved by giving the free loops alternately different lengths. In every case the features described afford the possibility of achieving, without thermal overloading of the heating conductor support in the edge region at which the loops are secured, a substantially higher power density in the flow cross-section and more particularly of also influencing deliberately the distribution of the power density. At the same time it is found that a heating conductor constructed according to the invention has a surprising mechanical stability, which is important because of the incident flow of air to be heated.

The interposition of free loops as discussed hereinbefore between the secured loops can also be regarded—at least in the case where there is one free loop between neighbouring secured loops—as a re-shaping of a conventional meander coil in such a manner that the outer, non-secured loop ends are folded inwardly—doubling the total number of loop ends. The invention proposes further developments along the lines of this kind of coil re-shaping. Thus, it is possible to arrange the free loops to be inclined at an acute angle relatively to the plane of the heating conductor support and the secured loops, in other words to be situated not precisely in the coil plane. It is possible thereby to reduce further the thermal stressing of heating conductor support and heating conductor wire in the inner region due to these radiating heat towards one another, whereas there are in fact improvements as regards the dispensing of heat to the throughflowing air and the flow resistance of the heating element. As a rule the angle formed by the free loops with the coil plane defined by the heating conductor support and the secured loops is relatively small and is preferably made to such dimensions that the spacing of the ends of the free loops from the coil plane is smaller than or at the most equal to the lateral spacing between neighbouring loop ends.

A further advantageous possibility for shaping the coil consists in arranging the loops so that they extend in corrugated manner in longitudinal sectional view taken at right angles to the heating conductor support, and preferably such corrugation is provided only at the secured loops. This arrangement affords the possibility of accommodating increased heating power in the flow cross-section, and also leads to effective stabilization of the loops.

Because of the substantially plane construction and arrangement of the heating conductor support and heating conductor, resistance heating elements according to the invention afford in a particularly simple manner the possibility of multiple arrangement, when a required heating power cannot be applied with one heating element, or different heating powers are to be achieved with heating elements of one and the same type. Such a multiple arrangement is characterised according to the invention by at least two heating conductor supports which are situated parallelly adjacent one another and each have a heating conductor, and also by a star-shaped holding element with holding arms extending substantially perpendicularly to the heating conductor supports, each of the heating conductor supports being secured to at least two such holding arms. For reasons of stability it is advisable to arrange the holding arms associated with a common heating conductor support to be diametrally opposite on the holding element.

This arrangement may for example be such that the holding arms project to opposite sides of the holding element, so that the latter is disposed between two heating conductor supports. But it is more advantageous to arrange that the heating conductor supports each have a central aperture, the holding arms associated with different heating conductor supports are of different lengths, and all are turned or directed towards the same side of the holding element, and the holding arms associated with the heating conductor supports further from the holding element extend through the apertures of the heating conductor supports nearer to the holding element. With this arrangement, all the heating conductor supports are situated at the same side of the holding element. The holding element itself is, as it were, cup-shaped and can be used both to accommodate a fan motor and also for securing to the housing at the same time. It has been found advantageous to construct and arrange the holding element in a corresponding manner even when using only one heating conductor support.

The invention will be discussed in more detail hereinafter with reference to the accompanying drawings showing some examples of embodiments of the invention. In the drawings:

FIG. 2 illustrates the subject of FIG. 1 with the fan or blower motor fitted; and FIG. 3 illustrates various constructional forms of the heating conductor.

Figure 1:
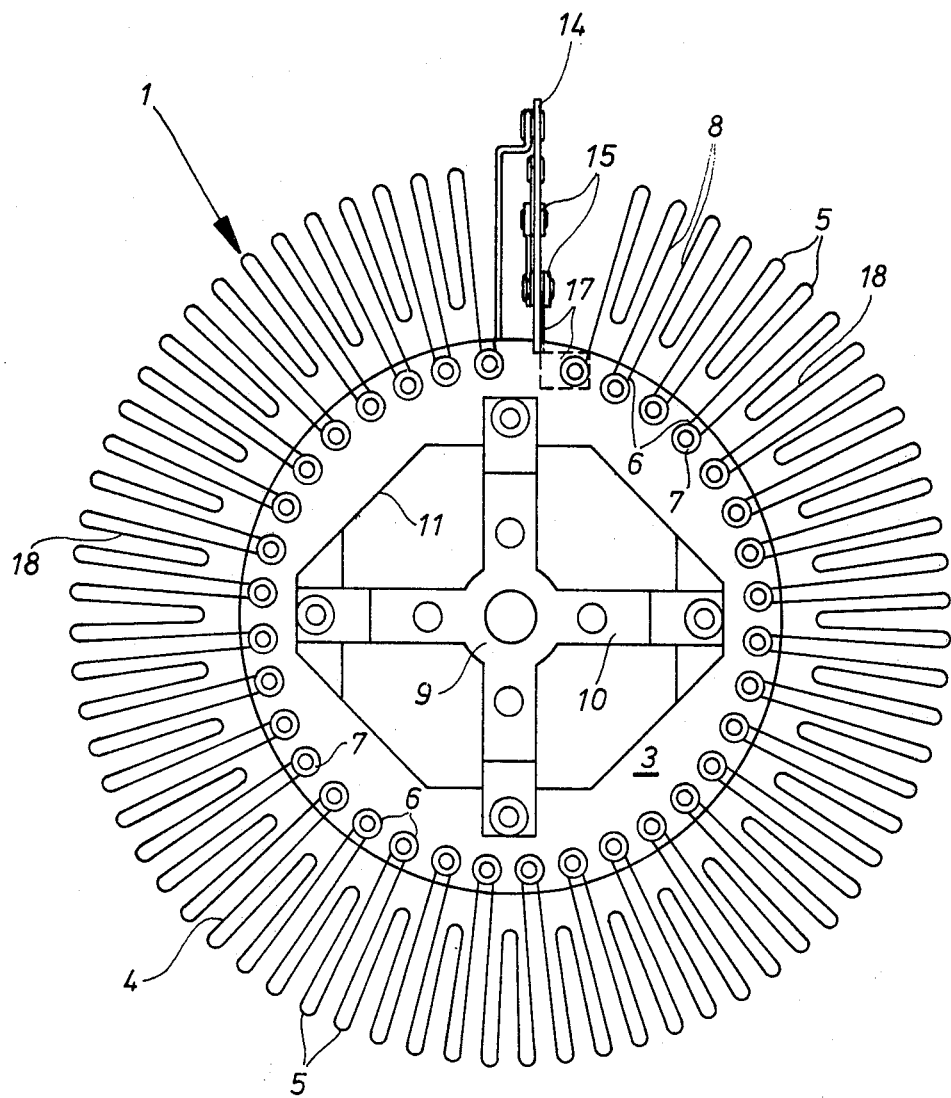
FIG. 1 illustrates a resistance heating element for a circular fan or blower in a front view.

FIGS. 1 and 2 show an arrangement of resistance heating elements which is intended for a circular fan or blower, two such resistance heating elements 1 being arranged parallel and adjacent to one another, one behind the other in the direction of the fan axis 2. Each of the resistance heating elements 1 comprises a heating conductor support 3 in the form of a flat plate of circular plan made of insulating material, and a heating conductor 4 of resistance wire which is wound in flat sinuously coiled formation. Because of its sinuous or meander coiling the heating conductor 4 has outer loop ends or bights 5 and also inner loop ends or bights 6 which are adjacent to the heating conductor support 3 and are secured to the edge region thereof by means of eyelets or pegs 7. The outer loop ends or bights 5, remote from the heating conductor support 3, project in self-supporting manner from the heating conductor support 3, without securing means. Between the inner and outer loop ends 5, 6 there extend loop legs or runs 8 the length of which determines substantially the radial extent of the heating conductor 4. The heating conductor support 3 and the coiled heating conductor 4 are situated substantially in a common plane.

The two resistance heating elements 1 provided in the illustrated constructional example are connected to one another by a holding element 9 which is of star-shaped construction with holding arms 10 which extend first in a plane parallel to the heating conductor supports 3 and then substantially perpendicularly to the heating conductor supports. Each heating conductor support 3 is secured to two diametrally oppositely situated holding arms 10. As more especially FIG. 2 shows clearly, the holding element 9 is of cup-shaped construction, in such a manner that all the holding arms 10 are directed to one and the same side of the holding element 9. The holding arms 10 which are associated with one and the same heating conductor support 3 have, of course, the same length as one another, whereas the holding arms 10 associated with different heating conductor supports 3 differ in length in accordance with the intended spacing between the resistance heating elements 1.

The heating conductor supports 3 each have a central aperture 11; in this constructional example the aperture 11 is substantially rhomboidal in form. The holding arms 10', to which the heating conductor support 3 further from the holding element 9 is secured, extend through the aperture 11 of the heating conductor support 3 which is nearer to the holding element 9. For this purpose the rhomboidal apertures 11 are turned through approximately 90° relatively to one another. A fan motor 12 with fan blading 13 is inserted between the holding arms 10 and secured to the holding element 9. This results in an extremely compact arrangement which is easy to assemble. The holding element 9 is also provided with securing elements for fitting in a fan housing; this is not illustrated in detail.

Between and at right-angles to the heating conductor supports 3 there extends a radially arranged connection plate 14 of insulating material, carrying heat-operated protective switches 15 and connecting elements 16. The connection plate 14 is connected to the heating conductor supports 3 by electrically conductive connecting straps 17 which at the same time establish an electrical connection with the heating conductors 4, the plate-supports connections in this constructional example comprising rivets.

The heating conductor 4 is wound in a particular way in the illustrated constructional examples. As shown in FIG. 1 there are interposed between the inner loop ends 6, which have already been dealt with and which are secured to the heating conductor support 3, further loops 18 which are directed towards the heating conductor support 3 and have a short length relatively to the secured loops; within the framework of the present invention these are referred to as free loops. In the constructional example of FIG. 1, the free loops 18 extend substantially to the edge of the heating conductor support 3, but without contacting the latter. As shown in FIG. 2 the free loops 18 are inclined at an acute angle relatively to the plane of the respective heating conductor support 3, and in fact into the intervening spaces and towards one another at both heating elements 1. This results in particularly favourable aerodynamic conditions and also protects the free loops 18 from deformation by mechanical action.

FIG. 3 shows various further constructional forms for the coiling of the heating conductor 4. FIG. 3a shows that the free loops 18 may also themselves consist of a plurality of loops which may be given alternately different lengths. As shown in FIG. 3a a free loop 18' of relatively short leg length follows a secured loop, whose inner end 6 is secured to the heating conductor support, and another such short loop 18' follows a free loop 18" of relatively considerable leg length which extends into the vicinity of the heating conductor support 3. FIG. 3b shows the heating conductor according to FIG. 3a in a longitudinal section taken at right-angles to the heating conductor support 3. It shows how the free loops 18', 18" are inclined at an acute angle $\alpha'$ and $\alpha''$ respectively in opposite directions relatively to the plane of the heating conductor support 3 and of the secured loops 6.

FIG. 3c shows the possibility of providing the loops, and in fact in the constructional example only those associated with the inner secured loop ends 6, with a wave or corrugation as viewed in longitudinal section taken at right-angles to the heating conductor support, whereas the free loops 18 follow a substantially straight course.

In the constructional forms described hereinbefore, the outer loop ends 5 are situated at substantially equal spacing from the edge of the heating conductor support 3. Departing therefrom, FIG. 3d shows a constructional form wherein the outer loop ends 19 situated between each group of two neighbouring free loops 18 have a larger spacing from the heating conductor support 3 than the outer loop ends 5 adjoining the secured inner loop ends 6.

What we claim is:

1. An electrical resistance heating element, for use in heating flowing gaseous media, comprising a heating conductor support of insulating material having a boundary edge with an essentially circular contour and a heating conductor of resistance wire which is sinuously coiled to form loops having inner and outer loop ends and loop legs, the loops being circularly arranged about said heating conductor support substantially in a plane, at least some of the inner loop ends being directly secured to the heating conductor support in the vicinity of said boundary edge, the heating conductor support being constructed as a flat plate substantially co-planar with the loops of the heating conductor, and the outer loop ends remote from the heating conductor support being arranged in a self-supporting manner without fixing means.

2. A resistance heating element according to claim 1, wherein between the loops secured at the inner loop ends to the heating conductor support there are interposed free loops which are directed towards the heating conductor support and are of relatively short length as compared with the secured loops.

3. A resistance heating element according to claim 2, wherein the free loops extend substantially of the edge of the heating conductor support.

4. A resistance heating element according to claim 2, wherein the free inner loops have alternately different lengths.

5. A resistance heating element according to claim 2, wherein the free loops extend inclined at an acute angle relatively to the plane of the heating conductor support and the fixed loops.

6. A resistance heating element according to claim 1, wherein the loops are disposed in corrugated manner in a longitudinal section taken at right-angles to the heating conductor support.

7. A resistance heating element according to claim 1, comprising at least two such heating conductor supports which are arranged parallel and adjacent to one another and each have such a heating conductor, and further comprising a star-shaped holding element having holding arms extending substantially perpendicularly to the heating conductor supports, each of the heating conductor supports being secured to at least two such holding arms.

8. A resistance heating element according to claim 7, wherein the heating conductor supports each have a central aperture, the holding arms associated with different heating conductor supports are of different lengths and are all turned towards the same side of the holding element, the holding arms associated with the heating conductor supports further from the holding element extending through the apertures of the heating conductor supports situated nearer to the holding element.

* * * * *